United States Patent
Pointer

(10) Patent No.: US 7,063,592 B2
(45) Date of Patent: Jun. 20, 2006

(54) METHOD AND APPARATUS FOR THE REMOVAL AND HANDLING OF HONEY FRAMES FROM BEEHIVE BOXES

(76) Inventor: William Pointer, 107 Walnut Rd., Fredericksburg, TX (US) 78624

( * ) Notice: Subject to any disclaimer, the term of this patent is extended or adjusted under 35 U.S.C. 154(b) by 0 days.

(21) Appl. No.: 10/863,448

(22) Filed: Jun. 8, 2004

(65) Prior Publication Data
US 2005/0282466 A1 Dec. 22, 2005

(51) Int. Cl.
*A01K 59/00* (2006.01)

(52) U.S. Cl. .......................... 449/51; 294/158

(58) Field of Classification Search ............... 449/35, 449/42, 43, 51, 61; 294/158
See application file for complete search history.

(56) References Cited

U.S. PATENT DOCUMENTS

| | | | | |
|---|---|---|---|---|
| 611,746 A | * | 10/1898 | Winter | 449/42 |
| 867,636 A | * | 10/1907 | Beeson | 449/35 |
| 1,184,491 A | | 5/1916 | Ross | 449/62 |
| 1,184,506 A | * | 5/1916 | Bacon | 449/42 |
| 1,518,077 A | | 12/1924 | Kouba | 449/50 |
| 1,553,734 A | | 9/1925 | Wilson | 294/118 |
| 4,176,416 A | | 12/1979 | Brittingham | 449/50 |
| 4,318,364 A | * | 3/1982 | Bescherer | 119/57.8 |
| 4,520,519 A | | 6/1985 | Kuehl | 449/51 |
| 4,573,228 A | | 3/1986 | Bachalo | 449/51 |
| 5,685,762 A | | 11/1997 | Penrose et al. | 449/51 |

OTHER PUBLICATIONS

Mann Lake Ltd., Hackensak, MN 2004 Catalog, Cover and p. 25.
Betterbee, Inc., Greenwich, NY 2004 Catalog, Cover, p. 23 and p. 28.
Glorybee Foods, Inc., Eugene, OR 2004 Catalog, Cover, p. 79 and p. 87.

* cited by examiner

*Primary Examiner*—Robert P. Swiatek
(74) *Attorney, Agent, or Firm*—Kammer Browning PLLC

(57) ABSTRACT

A system and method for the removal, handling, and inspection of honey frames from beehive boxes. The system includes a handle bar positioned on the top plate of an improved frame structure. The handle bar retains two threaded T-bolts that are aligned with threaded aperture inserts that have been positioned in the top plate to form the improved honey frame. The threaded bolts are secured within the threaded aperture inserts to a spaced attachment to the frame. Once positioned, excess top wax is scraped away and the frame lifted from the hive by the handle bar. The tubular handle bar is appropriately configured to be inserted into a circular clamp that may be positioned on a table or other structure. The circular clamp grips and retains the handle bar and the attached frame in a position appropriate for inspection.

19 Claims, 2 Drawing Sheets

METHOD AND APPARATUS FOR THE REMOVAL AND HANDLING OF HONEY FRAMES FROM BEEHIVE BOXES

BACKGROUND OF THE INVENTION

1. Field of the Invention

The present invention relates generally to the field of apiculture. The present invention relates specifically to a method and apparatus for the removal and handling of honey frames that are positioned in beehive boxes.

2. Description of the Related Art

The typical beehive box used in apiculture comprises a rectangular box that holds an array or series of honey frames. Each frame is generally rectangular in configuration and fitted with a hive cell structure in the center so as to equip the bees with a foundation upon which they may deposit wax, raise brood, and store pollen and honey. The honey frames are positioned and spaced so as to allow the bees to move freely throughout the hive and are intended to allow the beekeeper to manage the bees' work to coincide with the beekeeper's desire to extract honey. Typically there is a rectangular lid that fits over the hive box in a manner that covers the array of honey frames. The honey frames are positioned parallel to one another, in a row, such that they may be removed one at a time (or collectively in some arrangements) for inspection and/or for the harvesting of the honey.

When the beekeeper wishes to inspect the hive or eventually to harvest the honey, the top of the hive box is removed (or one hive box is removed from on top of another) and the frames are extracted and removed. Typically, the bees will have sealed the frames within the hive with propolis to the extent that it is usually necessary for the beekeeper to cut each frame free of the hive for removal. Special knives and tools have been developed in the industry for this purpose. Each frame will typically have a top plate that is longer than an opposing side of the frame. In this manner, when inserted into the hive, the extended ends of the top plate of the frame serve to provide a manner of "hanging" the frame within the box hive, and also serve as something of a handle to assist with lifting the frame from the hive, and thereafter manipulating it for inspection. In most cases, however, it is difficult for a beekeeper to access these edges of the top plate of the frame to even initially lift the frame from the hive.

Various efforts have been made in the past to provide tools that assist with the removal of honey frames from beehive boxes. Many of these tools involve complex automated devices designed to extract the entire set of frames from a box, and maneuver the frames across a conveyer to a point where the honey is extracted. Examples of these include the following:

U.S. Pat. No. 4,520,519, issued to Kuehl, entitled Apparatus for Removing Honey Frames from Supers. This patent describes a lifting mechanism adapted to receive a number of stacked hive boxes. Each box is individually positioned on the machine in order to be scraped on the top and bottom in a manner that removes the layer of beeswax there from and facilitates the removal of the individual frames.

U.S. Pat. No. 5,685,762, issued to Penrose et al., entitled De-Boxing Apparatus for Honey Frames. This patent describes a complex system wherein the frames are first raised with the box and are then pushed out of the box from below onto supporting brackets.

U.S. Pat. No. 4,573,228, issued to Bachalo, entitled Lifting Device for Removing Honeycomb Assemblies from Supers. This patent describes a system designed to engage a large number of frames at one time. An array of rotating bars slip beneath the top plate of each frame and are then turned so as to engage the underside of the top plate, and allow the entire array of frames to be lifted from the box.

Other efforts in the past have been directed to the removal of an individual frame from a beehive one at a time by hand. Examples of these types of devices include the following:

U.S. Pat. No. 1,184,491, issued to Ross, entitled Appliance for Removing Comb Frames from Beehives. This patent describes a "U" shaped handle that positions rotatable "hooks" on either side of the frame top plate and then rotates the hooks under the lip of the frame by means of a thumb operated slide. The user may then lift the frame out from the hive box using the handle and thereafter release the frame by releasing the spring loaded thumb slide.

U.S. Pat. No. 1,553,734, issued to Wilson, entitled Tool for Extracting Frames from Beehives. This patent is directed to an elongated pliers type device designed to engage and grasp the top plate of the frame while it is within the beehive. The beekeeper exerts constant pressure on the handles of the clamping device and then pulls upward to remove the frame from the box.

Other efforts have been made in the past to facilitate the handling of honey frames once removed from the beehive box. Some of these include the following:

U.S. Pat. No. 1,518,077, issued to Kouba, entitled Honeycomb Rack. This device is simply a stand for positioning the honeycomb frame once it has been removed from the hive. The structure and various features of the device allow the frame to be positioned in a variety of orientations for both inspection and honey harvesting.

U.S. Pat. No. 4,176,416, issued to Brittingham, entitled Bee Frame Caddy. This patent describes a rectangular frame that allows each honey frame, once extracted from the hive, to be hung in series for inspection and later for harvesting. One end of the frame provides for an elevated inspection structure that positions an individual honey frame at a more appropriate viewing height.

Most of the efforts in the past have been directed to the automated removal of a large number of frames from a large number of hive boxes. Various complex mechanisms for automatically positioning, cutting the propolis, and removing each frame have been designed. While these may be appropriate for the industrial sized beekeeping business or facility, they are hardly appropriate for the individual beekeeper, who works on a small scale, or as a hobby. In addition the extreme complexities of most of the automated systems lend themselves to constant maintenance and repair as well as cleaning.

The individual beekeeper requires something along the lines of the single frame handle or clamp described above in the Wilson patent. The device of the Wilson patent, however, suffers from a number of drawbacks. First, and perhaps most importantly, the user must constantly exert clamping force on the tool in order to extract the frame from the hive, as well as while manipulating the frame for inspection or harvesting. The ability to do this with a device of the type disclosed in the Wilson patent is greatly exacerbated by the presence of the wax-like propolis on the frame. The beekeeper must generally cut the propolis away from the frame, otherwise the tool cannot grip the frame tightly enough to forcibly extract the frame from the hive box. This greatly limits the ability of the beekeeper to work with the honeycomb within the frame without damaging or dropping the frame altogether. In addition, the pliers type clamp of the Wilson device does not provide an easy way of inspecting the honeycomb once it is removed from the hive. Manipulating the holder system while still clamping the device on the frame would prove to be quite difficult.

It would be desirable, therefore, to provide a simple handling device and system to facilitate the removal and inspection of honey frames from beehive boxes. It would be desirable if such a handle system worked with a single frame at a time or with multiple frames at a time, and required no constant exertion force in order to retain the frame to the handle. It would further be desirable if the handle system and the improved frame system associated with the handle system also provided an easy and yet secure means for manipulating the frame for inspection.

SUMMARY OF THE INVENTION

It is therefore an object of the present invention to provide a system and method for the removal, handling, and inspection of honey frames from beehive boxes. The system includes a handle bar that may be positioned along the edge of and parallel with the top plate of the improved honey frame of the present invention. The handle bar retains two threaded bolts that are aligned with threaded apertures that have been positioned in the top plate of the honey frame. The threaded bolts are secured within the threaded apertures into a spaced attachment to the improved frame. Once positioned in this manner, the propolis may be cut from the frame top plate as necessary, and the frame lifted from the hive by the beekeeper's handling of the handle bar. Although the beekeeper may wish to cut the propolis away to facilitate the removal of the frame it should be noted that the system of the present invention greatly reduces or eliminates the need for such work preparatory to the removal of the improved frame. This is due to the increased force that may be exerted on the frame to extract it from the box without concern that that handle will be released from the frame. Once the frame is removed from the box, the tubular handle bar is configured to be inserted into a clamping device that may be positioned at an appropriate height on and over a table or other structure. The clamping device grips at least one end of the handle bar of the system and retains the handle bar and the attached frame in a position appropriate for inspection. The clamping device permits the beekeeper to turn the frame within the clamp at any angle desired for progressive inspection of the entire honeycomb.

DETAILED DESCRIPTION OF THE PREFERRED EMBODIMENTS

Figure 1:
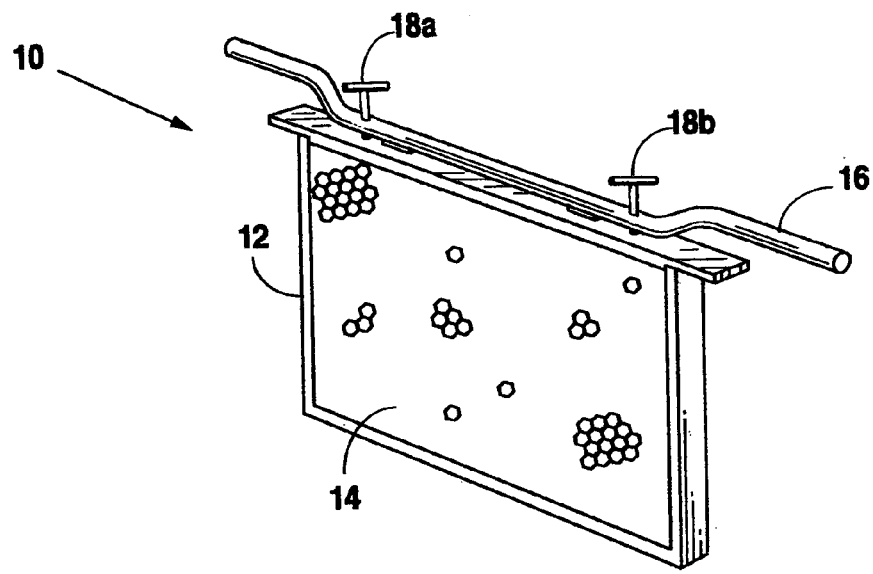
FIG. 1 is a perspective view of the handle system of the present invention shown attached to an improved honey frame of the present invention.

Reference is made first to FIG. 1 for a description of the basic structure of the present invention and the manner in which it is attached to the improved honey frame. Frame handle 10 is positioned as shown on hive frame 12 containing foundation 14. Frame handle 10 comprises handle bar 16 and T-bolts 18a and 18b. Handle bar 16 may, in the preferred embodiment, be constructed of tubular metal bent into the configuration shown so as to provide for easing gripping by the beekeeper. Its length should be somewhat longer than the standard honey frame, and its width should be slightly less than the typical width of a honey frame top plate.

Two or more T-bolts 18a and 18b are positioned through handle bar 16 with the winged portions of the bolts positioned above the handle bar. In this manner, the threaded portions of T-bolts 18a and 18b are positioned to engage threaded apertures (not shown) that have previously been positioned within the top plate of frame 12.

Figure 2:
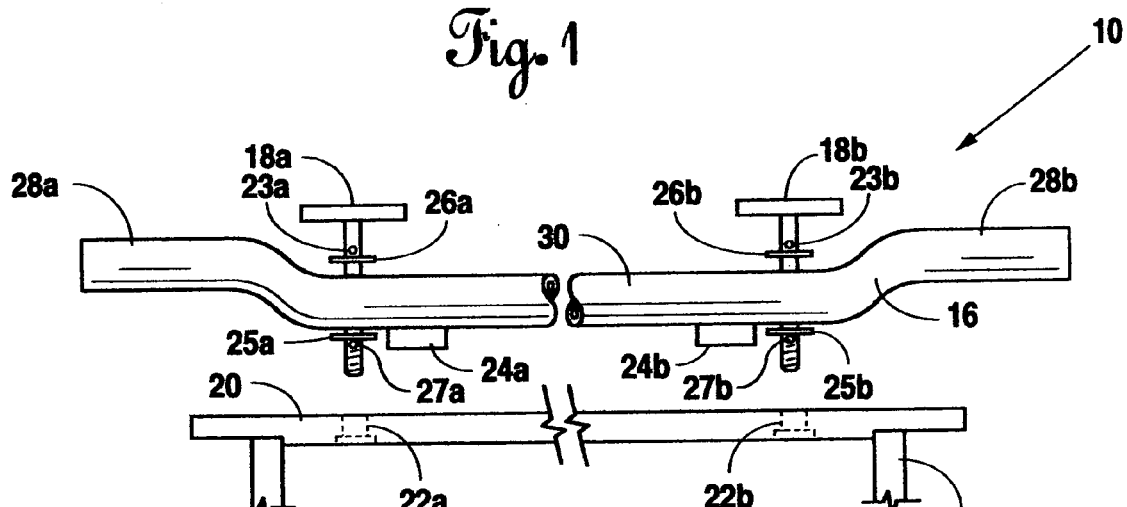
FIG. 2 is a side view showing greater detail of the handle bar of the present invention as it is being attached to an improved honey frame configured for receiving the handle.

FIG. 2 shows in greater detail the structures associated with frame handle 10. In this view handle bar 16 is seen to comprise handle grips 28a and 28b which are distinguished form handle mid-section 30 by their elevated position. T-bolts 18a and 18b are shown positioned through aligned apertures that have previously been drilled through handle bar 16. In this manner, T-bolts 18a and 18b may be positioned and turned to the point of engagement with threaded apertures 22a and 22b, as described in more detail below. T-bolts 18a and 18b are held loosely captive in handle bar 16 by washers 25a/26a and 25b/26b which are in turn held in place by set pins 23a/27a and 23b/27b as shown.

Structured in conjunction with handle bar 16 are spacer plates 24a and 24b. These plates on handle bar 16 serve two purposes during the attachment of frame handle 10 to hive frame 12. First, spacer plates 24a and 24b maintain a space between handle bar 16 and frame top plate 20. This prevents bees, which are often roaming about the top of frame top plate 20 from being crushed when frame handle 10 is attached. Second, the space allows for some tension to occur in the attachment process such that T-bolts 18a and 18b may be maintained tightly within the threaded apertures.

Hive frame 12 may be constructed in the manner of any of a number of typical wooden or plastic hive frames. Wooden frames have historically been the most common in the industry, both for large scale operations and individual bee keepers. Improved frames for use in conjunction with the present invention may be either retrofit with the appropriate threaded apertures as described below, or may initially be manufactured with these threaded apertures already installed. In either case, threaded apertures 22a and 22b are preferably constructed of metal and are designed to be inserted into drilled holes from the underside of top plate 20 of frame 12. Metal apertures for insertion into pre-drilled holes in wood of this type are well known in the art. Typically, one side of the threaded aperture is flanged or has an integral washer so as to prevent the aperture from being pulled through the wood by the bolt received, which typically engages the aperture from the opposite side of the plate. Such a structure is shown in FIG. 2.

Figure 3:
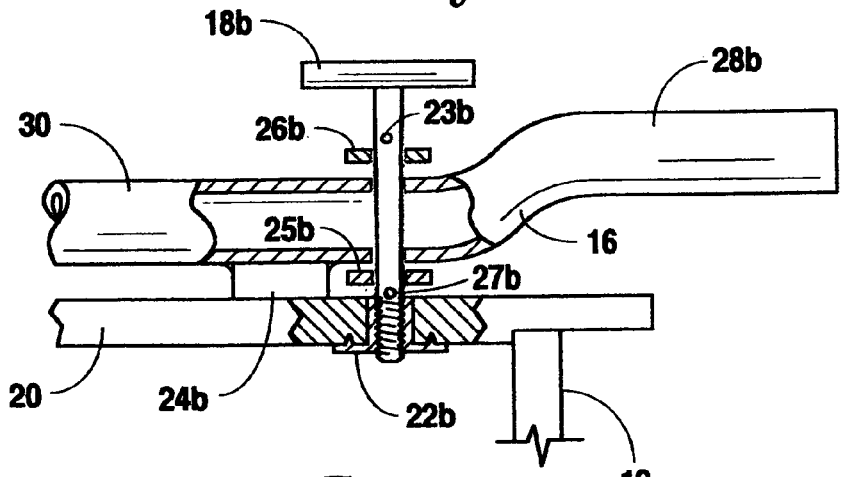
FIG. 3 is a partial cross-sectional view showing in greater detail the attachment components of the present invention.

Reference is now made to FIG. 3 for a brief description of the individual mechanism for attaching handle bar 16 to improved honey frame 12. One end of handle bar 16, as shown in this view, comprises handle grip 28b which extends from handle mid-section 30. T-bolt 18b is shown passing through an upper aperture in handle bar 16 and is held in place in part by washer 26b and set pin 23b. T-bolt 18b thereafter extends through an aligned aperture in the bottom of handle bar 16 to a point where it may appropriately engage threaded insert 22b. T-bolt 18b is held captive from below handle bar 16 by washer 25b and set pin 27b. Threaded insert 22b in this view is shown as it would be positioned within frame top plate 20 of hive frame 12. Some spacing features shown in FIG. 3 are worth noting. Specifically, T-bolt 18b must be positioned at an appropriate distance from the curve in handle bar 16 that rises up into handle grip 28b so as to prevent T-bolt 18b from making contact with handle grip 28b when it is fully attached to honey frame 12. In addition, the geometry of spacer plate 24b, which is shown in greater detail in this figure, must be such that the thickness of spacer plate 24b is sufficient to maintain a space between handle bar 16 and frame top plate 20 appropriate for preventing the crushing of any bees that might be present thereon and appropriate for maintaining tension in the attachment structure. This space must also accommodate the free turning of washer 25b and set pin 27b.

Figure 4:
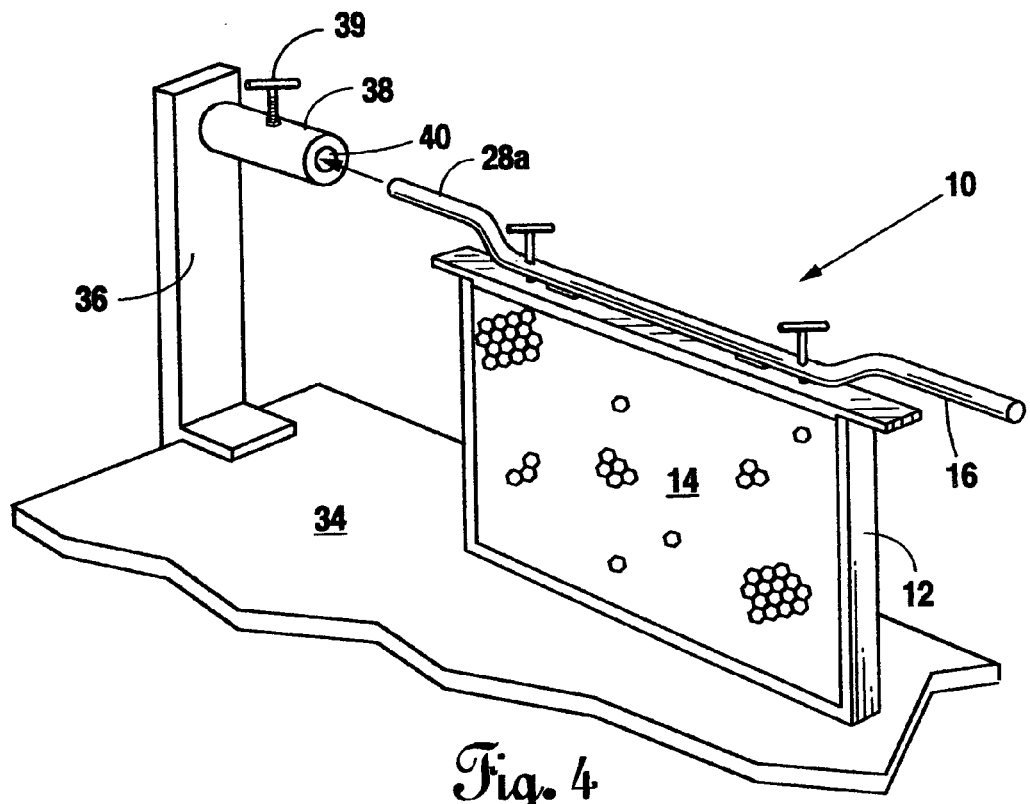
FIG. 4 is a perspective view of the complete system of the present invention, including the inspection bracket positioned for receiving a handle bar.

Reference is now made to FIG. 4 for a detailed description of the manner in which the handle system of the present invention may be utilized for not only the removal of the honey frame from the hive box but also the manipulation of the frame for inspection. FIG. 4 shows frame handle 10 attached to an improved hive frame 12 with foundation 14. Handle bar 16 of frame handle 10 is, in the preferred embodiment, a tubular metal handle configured and curved as shown. Typically, a honey frame must be manipulated at waist level or eye level over a table for inspection of the individual cells within the honeycomb. Provided for this purpose in the present invention is clamp-on frame holder 36 shown positioned on the edge of tabletop 34, the clamp-on aspect of the device to the tabletop being accomplished in a manner well known in the art. Clamp-on frame holder 36 comprises a rotation cylinder 38 positioned on an upright portion of the clamp-on frame holder. Rotation cylinder 38 presents handle aperture 40 at an angle and in a direction appropriate for the insertion of handle bar 16 therein. Various mechanisms, again well known in the art, for rigidly maintaining handle bar 16 within aperture 40 are anticipated. These might include a variety of clamping mechanisms that grip the handle upon insertion or, as shown in FIG. 4, that grip when threaded set screw 39 is turned and tightened to secure the handle. In any event, a number of mechanisms are appropriate for maintaining handle bar 16 in an appropriate orientation within handle aperture 40.

Rotation cylinder 38 may, in the preferred embodiment, be any of a number of circular, captive structures positioned on clamp-on frame holder 36 and should permit rotation of handle bar 16 about an axis that is generally defined by its longitudinal dimension. In this manner, handle bar 16 and the attached honey frame 12 may be rotated in a complete circle about the axis defined by handle bar 16 and then secured at a desired inspection angle within clamp-on frame holder 36 by the tightening of set screw 39. The retention of the handle bar within rotation cylinder 38, while retention set screw 39 is loosened for rotation, may be facilitated by inscribing a shallow groove around the handle being inserted into the cylinder at one or more points along the length of the inserted handle. Set screw 39, when slightly loosened, may then serve to prevent the removal of the handle from the cylinder while still allowing for its rotation within the cylinder. In this manner the present invention provides a system, not only for facilitating the removal of the improved honey frame from the hive box, but also for inspection of the honey frame, and in some instances, for harvesting of the honey.

Figure 5:
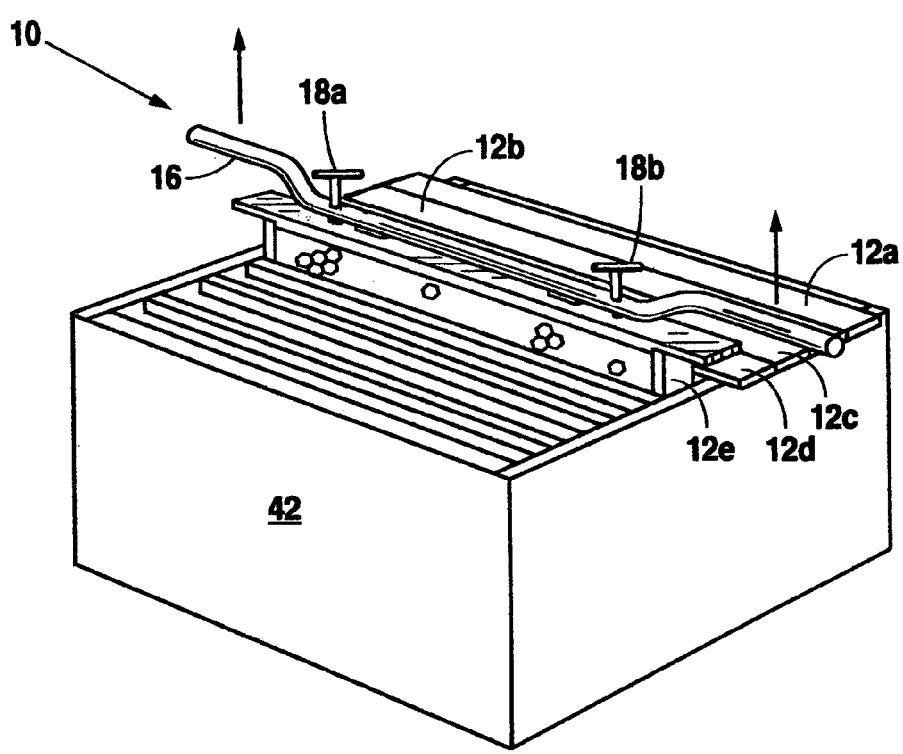
FIG. 5 is a perspective view showing the handle system of the present invention attached to an improved honey frame of the present invention within a hive box, with the frame being extracted from the box.

Reference is finally made to FIG. 5 for a brief description of the method and manner in which the system of the present invention is utilized for removal of individual honey frames from the hive box. In FIG. 5, hive box 42 is shown with an array of improved hive frames 12a–12e, positioned parallel and one after the other within the box structure. Handle bar 16 of frame handle 10 is positioned across each frame 12 in progression (or more than one collectively) and T-bolts 18a and 18b are turned so as to threadably engage threaded aperture inserts (not shown in this view). Once T-bolts 18a and 18b have fully engaged the threaded apertures and the spacer plates have engaged the top side of frame 12, the beekeeper may choose to cut any excess propolis from the top of the frame as desired (although this step is generally deemed unnecessary with the improved system of the present invention). Once removed, the beekeeper may securely grip handle bar 16 and lift the frame from the hive. The attachment of the present invention is sufficiently secure as to allow the beekeeper to rock, slide and otherwise loosen the frame from the hive box, without concern for letting go of the frame. Once loose, the frame may be extracted from the box as shown in FIG. 5. Once an individual frame has been removed and inspected or harvested, it may be reinserted into the box, or left out as the need may demand. In any event, the handle bar of the present invention may be removed from the frame thus extracted from the box by reverse turning the threaded bolts so as to loosen and eventually separate the handle bar from the frame. The same frame handle may then be utilized for attachment to, and subsequent removal of, the next frame within the hive box.

Although the present invention has been described in conjunction with a number of preferred embodiments, it is anticipated that those skilled in the art will discern modifications, additions, and alterations of the preferred embodiment that remain within the scope and spirit of the invention. Such modifications include various configurations for the handle bar of the present invention, as well as different means for attaching the handle bar to the top side of each honeycomb frame. Although a threaded bolt/threaded aperture combination for attaching the bar to the frame is described herein, alternate means of attachment, as long as they permit the release of the bar after use would be considered appropriate with the system of the present invention. Any attachment means that may be hand manipulated from a releasable condition to an attached condition may be appropriate as a substitute for the threaded bolt/threaded aperture structure described herein. Likewise, a variety of mechanisms may be anticipated for the clamp-on frame holder structure of the system of the present invention. The basic concept of the present invention might be implemented in conjunction with multiple frame manipulation device structures. In other words, the improved frame of the present invention, in conjunction with the attachment means, may find application in a handle arrangement capable of removing and handling multiple frames at one time. Those skilled in the art will recognize modifications and adaptations of the designs and structures described herein that would remain within the scope and spirit of the invention, which is defined by the following claims.

I claim:

1. An apparatus for the removal, handling, and inspection of honey frames from beehive boxes comprising:
    (a) a handle bar, said handle bar being generally longitudinal in configuration and having a length generally longer than a top plate of one of said honey frames, said handle bar further comprising a plurality of first connector elements positioned in spaced relationship on said handle bar and oriented generally orthogonal to the longitudinal dimension of said handle bar, said first connector elements captive on said handle bar; and (b) a plurality of second connector elements, at least one of said second connector elements for each of said first connector elements and releasably connectable thereto, said second connector elements positioned on said top plate of each of said honey frames so as to receive and hold said first connector elements when said handle bar is positioned and aligned adjacent to said top plate and said first and second connector elements are connected.

2. The apparatus of claim 1 wherein said handle bar further comprises at least one spacer plate positioned on a side of said handle bar oriented to contact said top plate of said honey frame when said handle bar is positioned adjacent said top plate and said first and second connectors are connected, said at least one spacer plate maintaining a gap between said handle bar and said top plate sufficient to prevent the crushing a honeybee when said handle bar is so engaged with said top plate.

3. The apparatus of claim 1 wherein said handle bar further comprises:
   a midsection that retains said plurality of first connector elements; and
   first and second handle sections positioned at either end of said midsection and having axes that are generally parallel to but displaced from an axis of said midsection, said displaced axes of said handle sections permitting a user to manually grip said handle bar after attachment to said honey frame.

4. The apparatus of claim 1 wherein said second connector elements are retrofit into an existing honey frame top plate.

5. The apparatus of claim 1 wherein said second connector elements are integrated into said honey frame top plate in its initial manufacture.

6. An apparatus for the removal, handling, and inspection of honey frames from beehive boxes comprising:
   a handle bar, said handle bar being generally longitudinal in configuration and having a length generally longer than a top plate of one of said honey frames, said handle bar further comprising a plurality of threaded bolts positioned in spaced relationship on said handle bar and oriented generally orthogonally to the longitudinal dimension of said handle bar, said threaded bolts rotatably captive on said handle bar; and
   a plurality of threaded aperture inserts, at least one of said threaded aperture inserts for each of said threaded bolts, said aperture inserts positioned on said top plate of each of said honey frames so as to receive and hold said threaded bolts when said handle bar is positioned and aligned adjacent to said top plate and said threaded bolts are turned.

7. The apparatus of claim 6 wherein said handle bar further comprises at least one spacer plate positioned on a side of said handle bar oriented to contact said top plate of said honey frame when said handle bar is positioned on said top plate and said threaded bolts are turned, said at least one spacer plate maintaining a gap between said handle bar and said top plate sufficient to prevent the crushing a honeybee when said handle bar is so engaged with said top plate.

8. The apparatus of claim 6 wherein said handle bar further comprises:
   a midsection that retains said plurality of threaded bolts; and
   first and second handle sections positioned at either end of said midsection and having axes that are generally parallel to but displaced from an axis of said midsection, said displaced axes of said handle sections permitting a user to manually grip said handle bar after attachment to said honey frame.

9. The apparatus of claim 6 wherein said threaded aperture inserts are retrofit into an existing honey frame top plate.

10. The apparatus of claim 6 wherein said threaded aperture inserts are integrated into said honey frame top plate in its initial manufacture.

11. An improved honey frame for use in conjunction with a beehive box, said honey frame having a top plate, said improvement comprising:
    a plurality of threaded aperture inserts positioned on said top plate so as to receive and engage a plurality of threaded bolts associated with an extraction device that may be positioned and aligned adjacent to said top plate and rigidly attached thereto, each of said threaded aperture inserts comprising a threaded section extending through said top plate and a flange positioned to prevent said threaded section from being pulled through said top plate upon engagement with said threaded bolts of said extraction device, said extraction device to facilitate the removal and handling of said improved honey frame from said beehive box.

12. A system for the removal, handling, and inspection of honey frames from beehive boxes comprising:
    a handle bar, said handle bar being generally longitudinal in configuration and having a length generally longer than a top plate of one of said honey frames, said handle bar further comprising a plurality of threaded bolts positioned in spaced relationship on said handle bar and oriented generally orthogonally to the longitudinal dimension of said handle bar, said threaded bolts rotatably captive on said handle bar;
    a plurality of threaded aperture inserts, at least one of said threaded aperture inserts for each of said threaded bolts, said aperture inserts positioned on said top plate of each of said honey frames so as to receive and hold said threaded bolts when said handle bar is positioned and aligned adjacent to said top plate and said threaded bolts are turned, said handle bar attachable to said honey frame with said threaded bolts and said threaded aperture inserts in a manner that facilitates the removal of said honey frame from said beehive box; and
    an inspection clamp attachable to a structure fixed on the ground, at a height suitable for viewing, said inspection clamp comprising a cylindrical grip for receiving and holding at least one end of said handle bar attached to said honey frame, said cylindrical grip having an axis generally coincident with an axis of said handle bar.

13. The system of claim 12 wherein said cylindrical grip comprises a cylinder and a set screw directed through a wall of said cylinder, said set screw serving to clamp said handle bar within said cylinder upon tightening and releasing said handle bar for rotation or removal upon loosening.

14. The system of claim 12 wherein said inspection clamp comprises a mounting bracket that permits removable attachment of the inspection clamp to a tabletop.

15. A method for the removal, handling, and inspection of honey frames from beehive boxes comprising the steps of:
    positioning a plurality of threaded aperture inserts in a top plate of each of said honey frames;
    providing a handle bar comprising a plurality of threaded bolts positioned thereon;

positioning said handle bar in aligned relation to said top plate of one of said honey frames in a manner that permits the attachment of said handle bar to said top plate of said honey frame;

threading said plurality of threaded bolts into said plurality of threaded inserts so as to attach said handle bar to said honey frame;

gripping said handle bar at each end thereof and exerting a force directing said honey frame out of said beehive box; and holding said handle bar and said honey frame attached thereto for inspection.

16. The method of claim 15 further comprising, after said holding step, the steps of:

inserting at least one of said ends of said handle bar into a circular clamp rigidly positioned at a height suitable for viewing;

rotating said honey frame to an angle suitable for the inspection of the condition of a honeycomb contained within said honey frame; and fixing said handle bar within said circular clamp so as to prevent further rotation of said honey frame during inspection.

17. The method of claim 15 wherein said step of positioning a plurality of threaded aperture inserts is carried out during the initial manufacture of the honey frame.

18. The method of claim 15 wherein said step of positioning a plurality of threaded aperture inserts comprises retrofitting an existing honey frame with said threaded aperture inserts.

19. A method for the removal, handling, and inspection of honey frames from beehive boxes comprising the steps of:

positioning a plurality of threaded aperture inserts in a top plate of each of said honey frames;

providing a handle bar comprising a plurality of threaded bolts positioned thereon;

positioning said handle bar in aligned relation to said top plate of one of said honey frames in a manner that permits the attachment of said handle bar to said top plate of said honey frame;

threading said plurality of threaded bolts into said plurality of threaded inserts so as to attach said handle bar to said honey frame;

gripping said handle bar at each end thereof and exerting a force directing said honey frame out of said beehive box;

removing said handle bar and said honey frame attached thereto from said beehive box;

inserting at least one of said ends of said handle bar into a circular clamp rigidly positioned at a height suitable for viewing;

rotating said honey frame to an angle suitable for the inspection of the condition of a honeycomb contained within said honey frame; and fixing said handle bar within said circular clamp so as to prevent further rotation of said honey frame during inspection.

* * * * *